| (12) | United States Patent | (10) Patent No.: | US 9,285,012 B2 |
|---|---|---|---|
| | Lach et al. | (45) Date of Patent: | Mar. 15, 2016 |

(54) INTERNAL COMBUSTION ENGINE WITH COMPENSATION WEIGHT ARRANGED ON THE CRANKSHAFT AND SERVING AS AN IMBALANCE, AND METHOD FOR PRODUCTION OF THE CRANKSHAFT

(71) Applicant: Ford Global Technologies, LLC, Dearborn, MI (US)

(72) Inventors: Rainer Lach, Wuerselen (DE); Joerg Bonse, Wuerselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 124 days.

(21) Appl. No.: 14/255,504

(22) Filed: Apr. 17, 2014

(65) Prior Publication Data

US 2014/0311441 A1 Oct. 23, 2014

(51) Int. Cl.
*F02B 75/06* (2006.01)
*F16F 15/32* (2006.01)
*F16F 15/28* (2006.01)

(52) U.S. Cl.
CPC .............. *F16F 15/322* (2013.01); *F16F 15/283* (2013.01)

(58) Field of Classification Search
CPC ......... F16F 15/264; F16F 15/22; F16F 15/26; F16F 15/322; F16C 3/20; B24B 5/428
USPC .............. 123/192.1, 192.2; 74/595, 596, 603, 74/604
See application file for complete search history.

(56) References Cited

U.S. PATENT DOCUMENTS

| 2,680,387 | A | * | 6/1954 | White | F16C 3/20 74/603 |
|---|---|---|---|---|---|
| 4,414,934 | A | * | 11/1983 | Vogl | F02B 75/16 123/192.2 |
| 4,730,512 | A | * | 3/1988 | Ito | F02B 75/22 123/192.1 |
| 4,867,007 | A | * | 9/1989 | Krotky | F16C 3/14 123/192.2 |
| 5,063,892 | A | * | 11/1991 | Maiorana | F02B 75/20 123/192.2 |
| 5,435,059 | A | * | 7/1995 | Chawla | F16C 3/20 29/888.08 |
| 5,481,942 | A | * | 1/1996 | Baek | F02B 75/22 123/192.2 |
| 5,664,464 | A | * | 9/1997 | Carson | F02B 75/32 123/197.4 |
| 6,324,942 | B1 | * | 12/2001 | Koike | B21K 1/08 123/192.2 |
| 6,398,655 | B1 | * | 6/2002 | Orlamunder | F16F 15/1206 464/68.1 |
| 8,757,027 | B2 | * | 6/2014 | Williams | F16C 3/20 123/192.2 |
| 2006/0150944 | A1 | * | 7/2006 | Stott | F16F 15/173 123/197.4 |

FOREIGN PATENT DOCUMENTS

| DE | 19745586 A1 | 4/1998 |
|---|---|---|
| DE | 102009054405 A1 | 6/2011 |

* cited by examiner

*Primary Examiner* — Marguerite McMahon
*Assistant Examiner* — Tea Holbrook
(74) *Attorney, Agent, or Firm* — LeClairRyan

(57) ABSTRACT

The invention concerns an internal combustion engine and a method of producing the engine in which the engine has at least one cylinder and with a crank drive comprising a crankshaft, in which the crankshaft mounted in the crankcase has an associated crankshaft throw, the crankshaft throws being arranged spaced apart along the longitudinal axis of the crankshaft, and at least one compensation weight serving as imbalance is arranged on the crankshaft on the side opposite at least one crankshaft throw. The compensation weight has an arcuate form on the outward-facing side, the outside of which running in the peripheral direction has a constant distance S from a reference axis which runs parallel to and spaced by a distance Δ from the longitudinal axis of the crankshaft, wherein the reference axis is arranged on the side facing away from the compensation weight, starting from the longitudinal axis of the crankshaft.

20 Claims, 1 Drawing Sheet

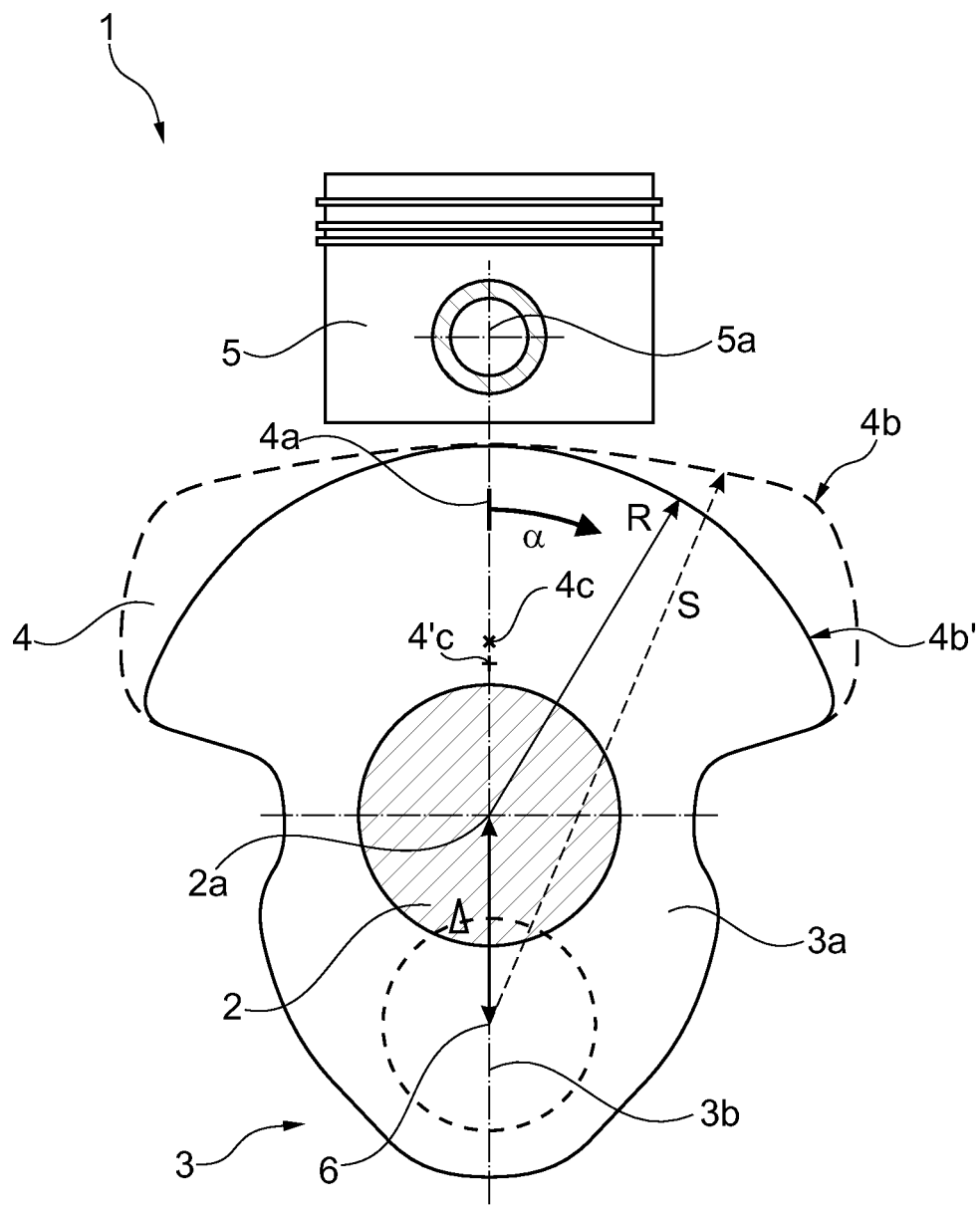

INTERNAL COMBUSTION ENGINE WITH COMPENSATION WEIGHT ARRANGED ON THE CRANKSHAFT AND SERVING AS AN IMBALANCE, AND METHOD FOR PRODUCTION OF THE CRANKSHAFT

CROSS-REFERENCE TO RELATED APPLICATION

This application claims priority to German Patent Application No. 102013206931.6, filed on Apr. 17, 2013, which is hereby incorporated by reference in its entirety.

TECHNICAL FIELD

The invention concerns an internal combustion engine with at least one cylinder and with a crank drive comprising a crankshaft, in which
the crankshaft mounted in a crankcase has an associated crankshaft throw for each cylinder, wherein the crankshaft throws are arranged spaced apart along the longitudinal axis of the crankshaft, and
at least one compensation weight serving as imbalance is arranged on the crankshaft on the side opposite at least one crankshaft throw, for the purpose of mass compensation.

Furthermore, the invention concerns a method for production of a crankshaft of such an internal combustion engine.

A crank drive comprises a crankshaft, pistons, piston pins and connecting rods, which are each connected pivotingly to the associated piston via the piston pin arranged in the small connecting rod eye and mounted rotatably on a crank journal of the crankshaft in the large connecting rod eye.

The piston serves for transmission of the gas forces generated by combustion to the crankshaft. The gas forces, to which the piston is exposed, are in this way transmitted via the piston pin to the connecting rod and from this to the crankshaft.

The arrangement described of piston, piston pin, connecting rod and crankshaft transforms the exclusively oscillating motion of the piston into a rotary motion of the crankshaft. The connecting rod moves partly rotationally and partly oscillating in the direction of the cylinder bore longitudinal axis.

The gas forces press the pistons downward in the direction of the cylinder bore longitudinal axis, wherein starting from the top dead center (TDC), the piston is forced into an accelerated movement by the gas forces. The piston, which tries to escape the gas forces with its downward directed movement, must carry with it on this downward directed movement the connecting rod which is connected pivotingly thereto. For this, the piston conducts the gas forces acting thereon to the connecting rod via the piston pin, and tries to accelerate this downward. As the piston approaches bottom dead center (BDC), together with the components connected thereto, in particular the connecting rod, it decelerates in order then to complete a movement reversal at the bottom dead center (BDC).

BACKGROUND OF THE INVENTION

The internal combustion engine, i.e. the engine, and the associated ancillaries are a vibratable system, the vibration behavior of which can be influenced. The most relevant vibratable systems or components under shock and force excitation are the crankcase, cylinder block, cylinder head, valve drive and crank drive, which is also the subject of the present invention. These components are exposed to the mass and gas forces.

The temporally changing rotary forces, which are introduced into the crankshaft via the connecting rods mounted pivotingly at the individual crank journals, excite the crankshaft into rotational vibrations. These rotational vibrations lead both to noise from structure-borne sound emission and noise from structure-borne sound transmission into the bodywork and into the internal combustion engine, wherein vibrations can also occur which have a disadvantageous influence on driving comfort, for example vibrations of the steering wheel in the passenger compartment. When the crankshaft is excited in its inherent frequency range, high rotational vibration amplitudes can occur, which can even lead to fatigue fracture. This shows that the vibrations are important not only in connection with noise design, but also with regard to component strength.

The rotational vibrations of the crankshaft are transmitted undesirably to the camshaft via the timing drive or camshaft drive, wherein the camshaft is itself also a vibratable system and can excite further systems, in particular the valve drive, to vibration. Vibrations can also be transmitted to other ancillaries via traction means driven by the crankshaft. Also the vibrations of the crankshaft are transmitted to the drive train, via which they can be transmitted as far as the vehicle tires.

The rotary force development at a crankshaft throw of a four-stroke internal combustion engine is periodic, wherein the periods extend over two revolutions of the crankshaft. Normally the rotary force development is broken down into its harmonic elements by Fourier analysis, to allow conclusions on the excitation of rotary vibrations. The actual rotary force development consists of a constant rotary force and a plurality of harmonically changing rotary forces, which have different rotary force amplitudes and frequencies or vibration counts. The ratio of the vibration count $n_i$ of each harmonic to rotation speed n of the crankshaft or engine is known as the order i of the harmonic.

Because of the high dynamic load on the crankshaft from the mass and gas forces, the aim during design of the internal combustion engine is to achieve as extensive, i.e., as optimized a mass compensation as possible. The term "mass compensation" covers all measures which outwardly compensate or reduce the effect of the mass forces. To this extent, mass compensation also comprises compensation of the moments provoked by the mass forces.

A mass compensation can take place in individual cases by a targeted matching of the crankshaft throws and the number and arrangement of the cylinders.

A six-cylinder in-line engine can be fully balanced in this way. The six cylinders are combined in pairs such that they run mechanically in parallel as cylinder pairs. So the first and sixth cylinders, the second and fifth cylinders, and the third and fourth cylinders are combined into cylinder pairs, wherein the crankshaft journals or throws for the three cylinder pairs are arranged on the crankshaft each offset by 120° CA. Running mechanically in parallel means that both pistons of the two cylinders running mechanically in parallel are at top dead center (TDC) and bottom dead center (BDC) at the same ° CA (degree crank angle).

In a three-cylinder in-line engine, the mass forces of the first order and the mass forces of the second order can also be fully compensated by selection of a suitable crankshaft throw, but not the moments which are provoked by the mass forces.

Complete mass compensation is not always achievable, so further measures must be taken, for example the arrangement of counter weights on the crankshaft, and/or equipping the internal combustion engine with at least one balancer shaft.

The starting point of all measures is the consideration that the crankshaft is loaded by the temporally changing rotary forces, composed of the gas forces and mass forces of the crank drive. The mass of the crank drive, i.e., the individual masses of the connecting rod, piston, piston pin, piston rings and the crankshaft itself, can be divided into an oscillating substitute mass and a rotating substitute mass. The external effect of the mass force of the rotating substitute mass can easily be compensated by counter weights arranged on the crankshaft.

Compensation is more difficult in the case of the mass force provoked by the oscillating substitute mass, since this is composed roughly of a mass force of the first order and a mass force of the second order, wherein forces of higher orders are negligible.

The mass forces of each order can be almost compensated by the arrangement of two contra-rotating shafts fitted with corresponding weights, known as balancer shafts. The shafts for compensating for mass forces of the first order run at the engine rotation speed, and the shafts for balancing the mass forces of the second order run at double the engine rotation speed. This method of mass compensation is very cost-intensive, complex as well as having a high weight, and requires a great deal of space. Within the context of compensating for the mass forces of the first order, the crankshaft can simultaneously serve as a balancer shaft, i.e., it can constitute one of the two balancer shafts, so that at least the weight and space required for mass compensation is reduced.

Even when the mass forces are completely compensated, mass moments arise since the mass forces of the individual cylinders act in the cylinder center planes. These mass moments can in individual cases be compensated by at least one balancer shaft equipped with weights. This further increases the space required, the costs, and the weight for the total mass compensation.

In a three-cylinder in-line engine, the moments provoked by the mass forces of the first order are compensated, for example, by a single balancer shaft contra-rotating to the crankshaft at the engine rotation speed, at the ends of which shaft two compensation weights serving as imbalance are arranged offset, i.e., twisted, by 180°.

Alternatively, the moments provoked by the mass forces of the first order in a three-cylinder in-line engine can also be compensated by two contra-rotating compensation weights serving as imbalance, wherein a first compensation weight runs in the same direction as the crankshaft and the second compensation weight runs in the opposite direction to the crankshaft. The essential difference from the mass compensation described above is that the two compensation weights serving as imbalance rotate in opposition to each other. Consequently the two compensation weights are not arranged on the same carrier, for example, a shaft, but on different carriers which give them a rotary motion in different directions of rotation. The carrier for the first compensation weight can, for example be the crankshaft itself or a body connected with the crankshaft, for example a flywheel. The second compensation weight requires a carrier rotating in the opposite direction to the crankshaft, which can itself also be driven by the crankshaft.

As explained in detail above, many concepts for compensating for mass forces and/or mass moments require the arrangement of compensation weights serving as imbalance on the crankshaft.

The external effect of the mass force of the rotating substitute mass for example can be compensated completely by compensation weights arranged on the crankshaft. Here, the at least one compensation weight serving as imbalance is arranged on the crankshaft on the side opposite at least one crankshaft throw, for the purpose of mass compensation.

Also, concepts for compensating for moments provoked by mass forces of the first order, for example of a three-cylinder in-line engine, can use compensation weights serving as imbalance which are arranged on the crankshaft.

The arrangement of compensation weights on the crankshaft in the manner described above can give rise to constructional problems. When the piston passes through bottom dead center, a compensation weight serving as imbalance, and arranged on the side opposite the crankshaft throw belonging to the piston, lies immediately below the piston, i.e., on the side facing the piston. Contact between the piston and the compensation weight as the crankshaft rotates must be prevented. Normally compensation weights have an arcuate form on the outward-facing side, wherein the outside of the compensation weight running in the peripheral direction has a substantially constant distance R from the longitudinal axis of the crankshaft.

The constricted spatial conditions in the crankcase however often make the arrangement of a compensation mass difficult, or require the arrangement of a comparatively large compensation mass, since the effective lever, namely the distance of the center of gravity of the imbalance from the longitudinal axis of the crankshaft, is or must be selected comparatively small, i.e., short, because of the small construction space available.

Where applicable, because of the constricted spatial conditions, mass compensation must be provided outside the crankcase. The provision of one or where applicable several balancer shafts outside the crankcase not only increases the space required in the engine bay of a vehicle and the costs, but also the fuel consumption. The increased fuel consumption is caused firstly by the additional weight of the compensation unit. Secondly, the compensation unit with its rotating shafts and other moving components contributes not insignificantly to the friction power of the internal combustion engine, or increases this friction power. The latter is particularly relevant because of the fact that the compensation unit is always and continuously in operation as soon as the internal combustion engine is started and operated.

With regard to fuel consumption however, the compensation masses and the entire weight of the mass compensation must in principle be as low as possible.

SUMMARY OF THE INVENTION

In this context, it is an object of the present invention to provide an internal combustion engine according to the preamble of claim 1 which is optimized with regard to mass compensation.

A further part object of the present invention is to provide a method for the production of the crankshaft of such an internal combustion engine.

The first part object is achieved by an internal combustion engine with at least one cylinder and with a crank drive comprising a crankshaft, in which the crankshaft mounted in the crankcase has an associated crankshaft throw for each cylinder, wherein the crankshaft throws are arranged spaced apart along the longitudinal axis of the crankshaft, and at least one compensation weight serving as imbalance is arranged on the crankshaft on the side opposite at least one crankshaft throw, for the purpose of mass compensation, and wherein
   the at least one compensation weight has an arcuate form on the outward-facing side, the outside of which running in the peripheral direction has a constant distance S from a reference axis which runs parallel to and spaced by a distance Δ from the longitudinal axis of the crankshaft, wherein the reference axis is arranged on the side facing away from the compensation weight, starting from the longitudinal axis of the crankshaft.

As in a conventional crank drive, the at least one compensation weight of a crank drive according to the invention has an arcuate form on the outward-facing side.

The essential difference of the crank drive of an internal combustion engine according to the invention from crank drives known from the prior art lies in that the outside of a compensation weight running in the peripheral direction does not have a substantially constant distance R from the longitudinal axis of the crankshaft, but rather a constant distance S from a reference axis which runs parallel to and spaced from the longitudinal axis of the crankshaft.

To this extent, the distance of the outside of a compensation weight from the longitudinal axis of the crankshaft, despite the arcuate form of the outside, is not constant but increases, starting from the center. The center of gravity of the at least one compensation weight is therefore shifted further towards the outside, i.e., the distance of the center of gravity from the longitudinal axis of the crankshaft increases, whereby the effective lever arm of the imbalance mass increases.

The reference axis according to the invention is arranged on the side facing away from the compensation weight, starting from the longitudinal axis of the crankshaft, so that S>R.

The longitudinal axis of the crankshaft is still the rotary axis of the rotating crankshaft and the rotary axis of the compensation weights rotating with the crankshaft. To this extent, the peripheral direction is predefined by the direction of rotation of the crankshaft, wherein the arcuate form of the outside of a compensation weight can be described or executed by a pointer of length S rotating about the reference axis in the peripheral direction.

The introduction of the reference axis described above for definition and geometric description of the arcuate form of the outside of a compensation weight, which according to the invention deviates from the longitudinal axis of the crankshaft, allows a more effective use of the limited space available in the crankcase, i.e., for the same construction space, larger imbalance masses can be arranged on the crankshaft or greater effective levers achieved, and hence the imbalance mass necessary for mass compensation can be reduced. The design of the at least one compensation weight according to the invention namely allows an increase in the distance of the center of gravity of the imbalance from the longitudinal axis of the crankshaft, i.e., the lever of the imbalance can be designed comparatively long. In individual cases, no mass compensation outside the crankcase need be provided.

Whereas the constricted spatial conditions in the crankcase according to the prior art could lead to the mass compensation having to be arranged at least partly outside the crankcase, this can be avoided by the design of the at least one compensation weight according to the invention.

The internal combustion engine according to the invention therefore achieves the first object on which the invention is based, namely the provision of an internal combustion engine according to the preamble of claim 1 which is optimized with regard to mass compensation.

Embodiments of the internal combustion engine are advantageous in which each piston belonging to a cylinder is connected pivotingly to the crankshaft via a connecting rod, wherein the connecting rod at one end is connected pivotingly to the piston via a piston pin and at another end is mounted rotatably on a crank journal of the associated crankshaft throw of the crankshaft.

Embodiments of the internal combustion engine are advantageous in which at least one compensation weight has a hammer-like shape.

Further advantageous embodiments of the internal combustion engine according to the dependent claims are explained below.

Embodiments of the internal combustion engine are advantageous in which the longitudinal axis of the at least one piston intersects the longitudinal axis of the crankshaft.

Embodiments of the internal combustion engine are advantageous in which, when the piston is at bottom dead center, the plane spanned by the two longitudinal axes forms the center plane of the at least one compensation weight.

In this context, embodiments of the internal combustion engine are advantageous in which the reference axis lies in a plane which is spanned by the longitudinal axis of the at least one piston and the longitudinal axis of the crankshaft.

Embodiments of the internal combustion engine are also advantageous in which the longitudinal axis of the crankshaft runs spaced from the longitudinal axis of the at least one piston. In this case, the crankshaft has an offset. The longitudinal axis of the crankshaft has a distance from the longitudinal axis of the at least one piston, i.e., is arranged eccentrically in relation to the piston.

In this context, embodiments of the internal combustion engine are advantageous in which, when the piston is at bottom dead center, a plane running through the longitudinal axis of the crankshaft and parallel to the longitudinal axis of the at least one piston forms the center plane of the at least one compensation weight.

Embodiments of the internal combustion engine are also advantageous in which the reference axis lies in the plane which runs through the longitudinal axis of the crankshaft and parallel to the longitudinal axis of the at least one piston. In this case, the reference axis has a horizontal distance from the plane which runs through the longitudinal axis of the at least one piston and parallel to the longitudinal axis of the crankshaft, wherein said distance corresponds to the offset of the crankshaft.

Embodiments of the internal combustion engine are also advantageous in which the reference axis lies in the plane which runs through the longitudinal axis of the at least one piston and parallel to the longitudinal axis of the crankshaft. In this case, the reference axis has a horizontal distance Δh from the plane which runs through the longitudinal axis of the crankshaft and parallel to the longitudinal axis of the at least one piston, wherein said distance is the same size as and oriented opposite to the offset of the crankshaft.

The horizontal distance Δh stands perpendicular to the planes defined above. In contrast to this horizontal distance Δh, a vertical distance of the reference axis to the longitudinal axis of the crankshaft is a distance or travel which runs parallel to the planes defined above, for example in the direction of the piston longitudinal axis.

In embodiments of the internal combustion engine in which the longitudinal axis of the crankshaft has an offset, it can be advantageous to space the reference axis horizontally from the longitudinal axis of the crankshaft, in order to be able to make optimum use of the space available in the crankcase for formation of the compensation weight, wherein the horizontal distance Δh need not but may correspond in direction and size to the offset of the crankshaft.

Embodiments of the internal combustion engine are advantageous in which the reference axis lies between the longitudinal axis of the crankshaft and the at least one crankshaft throw. In this embodiment, the reference axis lies on the side of the crankshaft facing away from the at least one compensation weight.

Embodiments of the internal combustion engine are advantageous in which for distance Δ: 0<Δ≤150 mm.

Embodiments of the internal combustion engine are advantageous in which for distance Δ: 0<Δ≤50 mm.

Embodiments of the internal combustion engine are advantageous in which for distance Δ: 50≤Δ≤100 mm. This embodiment is suitable in particular for internal combustion engines with a capacity of 1.6 to 2.4 liters.

Embodiments of the internal combustion engine are advantageous in which for distance Δ: 100≤Δ≤150 mm. Internal combustion engines for smaller utility vehicles have larger crank radii which allow distance Δ to be increased or selected larger.

As already stated, the distance Δ can have a horizontal component or be a horizontal distance, in particular in embodiments of the internal combustion engine in which the longitudinal axis of the crankshaft has an offset. Since the horizontal distance Δh here stands in a direct technical correlation to the offset of the crankshaft, embodiments are advantageous in which this horizontal distance Δh is dimensioned according to the offset.

Embodiments of the internal combustion engine are therefore advantageous in which for distance Δ or Δh: 3≤Δ≤15 mm or 3≤Δh≤15 mm.

In particular, embodiments of the internal combustion engine are advantageous in which for distance Δ or Δh: 5≤Δ≤12 mm or 5≤Δh≤12 mm.

In internal combustion engines with three cylinders, embodiments can be advantageous in which the crankshaft has three crankshaft throws.

Embodiments of the internal combustion engine are advantageous in which the at least one compensation weight comprises an imbalance mass to compensate for the mass force of the rotating substitute mass.

Embodiments of the internal combustion engine are also advantageous in which the at least one compensation weight comprises an imbalance mass to compensate for the moments provoked by the mass forces of the first order.

As already stated, the moments provoked by the mass forces of the first order, for example in a three-cylinder in-line engine but also in a five-cylinder in-line engine or a V-engine with six or eight cylinders, can be compensated by two compensation weights serving as imbalance and rotating opposite each other. A first compensation weight rotating in synchrony with the crankshaft can be arranged on the crankshaft itself, whereby no balancer shaft is provided. The crankshaft itself then assumes the function of a balancer shaft.

The second part object on which the invention is based, namely the provision of a method for production of the crankshaft of an internal combustion engine of the type described initially, is achieved by a method which is characterized in that the crankshaft is forged together with the at least one compensation weight arranged on the crankshaft.

The statements made above in relation to the internal combustion engine according to the invention also apply according to the method of the invention.

Method variants are advantageous in which the crankshaft is drop-forged together with the at least one compensation weight arranged on the crankshaft.

Alternatively, the crankshaft can be cast together with the at least one compensation weight arranged on the crankshaft, and then machined. A further variant would be an assembled crankshaft in which the crankshaft is constructed in modular fashion.

The above advantages and other advantages and features will be readily apparent from the following detailed description of the preferred embodiments when taken in connection with the accompanying drawings.

BRIEF DESCRIPTION OF THE DRAWING

For a more complete understanding of this invention, reference should now be made to the embodiments illustrated in greater detail in the accompanying drawing and described below by way of examples of the invention wherein:

FIG. 1 is a diagrammatic view of a vehicle brake system according to the disclosed inventive concept.

FIG. 1 diagrammatically illustrates parts of the crank drive of a first embodiment of the internal combustion engine in side view.

DETAILED DESCRIPTION OF THE PREFERRED EMBODIMENTS

In the attached figure the same reference numerals will be used to refer to the same components. In the following description various operating parameters and components are described for different constructed embodiments. These specific parameters and components are included as examples and are not meant to be limiting.

FIG. 1 shows, diagrammatically in a side view, parts of the crank drive 1 of a first embodiment of the internal combustion engine with piston 5 at bottom dead center.

The crank drive 1 comprises a crankshaft 2 and a piston 5 which is connected pivotingly to the crankshaft 2 via a connecting rod (not shown), wherein the connecting rod is connected pivotingly to the piston 5 via a piston pin in the small connecting rod eye and mounted rotatably on a crank journal 3b of the crankshaft 2 in the large connecting rod eye. The crank journal 3b is laterally delimited by two spaced crankshaft webs 3b of the associated crankshaft throw 3.

When the crankshaft 2 is rotating about the longitudinal axis 2a, the piston 5 performs an oscillating motion along its longitudinal axis 5a (direction of rotation α indicated by arrow). The longitudinal axis 5a of the piston 5 intersects with the longitudinal axis 2a of the crankshaft 2.

On the side opposite the crankshaft throw 3, a compensation weight 4 serving as imbalance is mounted on the crankshaft 2 for the purpose of mass compensation. When the piston 5 is at bottom dead center, the plane spanned by the longitudinal axis 5a of the piston 5 and the longitudinal axis 2a of the crankshaft 2 forms the center plane 4a of the compensation weight 4, that is to say the plane of symmetry here.

According to the prior art, the compensation weight 4 has an arcuate form (solid line) in which the outward-facing side, i.e., the outside 4b' running in the peripheral direction, has a constant distance R from the longitudinal axis 2a of the crankshaft 2 over rotary angle α.

The compensation weight 4 according to the invention also has an arcuate form (dotted line), wherein the outward-facing side, i.e., the outside 4b running in the peripheral direction, has a constant distance S from a reference axis 6 which runs parallel to and spaced by a distance Δ from the longitudinal axis 2a of the crankshaft 2. The reference axis 6 lies predominantly in the center plane 4a between the longitudinal axis 2a of the crankshaft 2 and the crankshaft throw 3. In other words, the reference axis 6 lies on the side of the crankshaft 2 facing away from the compensation weight 4.

In the embodiment shown in FIG. 1, the distance of the outside 4b from the longitudinal axis 2a of the crankshaft 2 increases in the same way towards both sides, starting from the center plane 4a. This gives the compensation weight 4 a hammer-like shape, wherein the center of gravity 4c of the compensation weight 4 moves further towards the outside in comparison with a center of gravity 4c' of a conventionally designed compensation weight.

Because the distance of the center of gravity 4c from the longitudinal axis 2a of the crankshaft 2 increases, the effective lever arm of the imbalance mass increases.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

The invention claimed is:

1. An internal combustion engine with at least one cylinder and with a crank drive comprising a crankshaft, in which
   the crankshaft mounted in the crankcase has an associated crankshaft throw for each cylinder, wherein the crankshaft throws are arranged spaced apart along the longitudinal axis of the crankshaft, and
   at least one compensation weight extending from a periphery of one or more of the crankshaft throws and being arranged on the crankshaft, for the purpose of a mass compensation,
   wherein
   the at least one compensation weight has an arcuate form on the outward-facing side, the outside of which running in the peripheral direction has a constant distance S from a reference axis which runs parallel to and spaced by a distance A from the longitudinal axis of the crankshaft, wherein the reference axis is arranged on the side facing away from the compensation weight, starting from the longitudinal axis of the crankshaft.

2. The internal combustion engine as claimed in claim 1, further including a piston for each cylinder, and wherein each piston belonging to a cylinder is connected pivotably to the crankshaft via a connecting rod, wherein the connecting rod at one end is connected pivotably to the piston via a piston pin and at another end is mounted rotatably on a crank journal of the associated crankshaft throw of the crankshaft.

3. The internal combustion engine as claimed in claim 2, wherein the longitudinal axis of each piston intersects the longitudinal axis of the crankshaft.

4. The internal combustion engine as claimed in claim 3, wherein when the piston is at bottom dead center, the plane spanned by the two longitudinal axes forms the center plane of the at least one compensation weight.

5. The internal combustion engine as claimed in claim 3, wherein the reference axis lies in the plane spanned by the longitudinal axis of the at least one piston and the longitudinal axis of the crankshaft.

6. The internal combustion engine as claimed in claim 2, wherein the longitudinal axis of the crankshaft runs spaced from the longitudinal axis of the at least one piston.

7. The internal combustion engine as claimed in claim 6, wherein when the piston is at bottom dead center, a plane running through the longitudinal axis of the crankshaft and parallel to the longitudinal axis of the at least one piston forms the center plane of the at least one compensation weight.

8. The internal combustion engine as claimed in claim 6, wherein the reference axis lies in the plane which runs through the longitudinal axis of the crankshaft and parallel to the longitudinal axis of the at least one piston.

9. The internal combustion engine as claimed in claim 1, wherein the reference axis lies between the longitudinal axis of the crankshaft and the at least one crankshaft throw.

10. The internal combustion engine as claimed in claim 1, wherein for distance $\Delta$: $0 < \Delta \leq 150$ mm.

11. The internal combustion engine as claimed in claim 1, wherein for distance $\Delta$: $0 < \Delta \leq 50$ mm.

12. The internal combustion engine as claimed in claim 1, wherein for distance $\Delta$: $50 \leq \Delta \leq 100$ mm.

13. The internal combustion engine as claimed in claim 1, wherein for distance $\Delta$: $100 \leq \Delta \leq 150$ mm.

14. The internal combustion engine as claimed in claim 1, wherein for distance $\Delta$: $3 \leq \Delta \leq 15$ mm.

15. The internal combustion engine as claimed in claim 1, wherein for distance $\Delta$: $5 \leq \Delta \leq 12$ mm.

16. A method for production of the crankshaft of an internal combustion engine as claimed in any of the preceding claims, wherein the crankshaft is forged together with the at least one compensation weight arranged on the crankshaft.

17. An internal combustion engine with cylinders and with a crank drive comprising a crankshaft having an axis, the engine comprising:
    a crankcase in which the crankshaft is mounted, said crankcase having a crankshaft throw for each cylinder, said throws being arranged spaced apart along the crankshaft axis; and
    a compensation weight extending from a periphery of one or more of said crankshaft throws and being arranged on the crankshaft, said weight having an outward-facing side that has an arcuate form, said outward-facing side runs in the peripheral direction and has a constant distance from a reference axis that is parallel to the crankshaft axis and spaced by a distance $\Delta$.

18. The internal combustion engine of claim 17 wherein said constant distance is distance S, and wherein the reference axis is arranged on the side facing away from the compensation weight, starting from the crankshaft axis.

19. The internal combustion engine of claim 17 further including a piston in each cylinder and wherein each piston is connected pivotably to the crankshaft via a connecting rod, wherein the connecting rod at one end is connected pivotably to the piston via a piston pin and at another end is mounted rotatably on a crank journal of the associated crankshaft throw of the crankshaft.

20. The internal combustion engine of claim 19 wherein each said piston has a longitudinal axis, and wherein said longitudinal axis of each piston intersects the crankshaft axis and wherein said piston can be moved to bottom dead center, wherein when said piston is at bottom dead center, the plane spanned by the two axes forms the center plane of said compensation weight.

* * * * *